US009890063B2

(12) United States Patent
Neti et al.

(10) Patent No.: US 9,890,063 B2
(45) Date of Patent: Feb. 13, 2018

(54) CARBON BED ELECTROLYSER FOR TREATMENT OF LIQUID EFFLUENTS AND A PROCESS THEREOF

(75) Inventors: Nageswara Rao Neti, Nagpur (IN); Tapas Nandy, Nagpur (IN)

(73) Assignee: COUNCIL OF SCIENTIFIC & INDUSTRIAL RESEARCH, New Delhi (IN)

(*) Notice: Subject to any disclaimer, the term of this patent is extended or adjusted under 35 U.S.C. 154(b) by 1062 days.

(21) Appl. No.: 13/992,064

(22) PCT Filed: Mar. 21, 2011

(86) PCT No.: PCT/IB2011/000594
§ 371 (c)(1),
(2), (4) Date: Aug. 19, 2013

(87) PCT Pub. No.: WO2012/076940
PCT Pub. Date: Jun. 14, 2012

(65) Prior Publication Data
US 2014/0008243 A1    Jan. 9, 2014

(30) Foreign Application Priority Data
Dec. 6, 2010  (IN) .......................... 2888/DEL/2010

(51) Int. Cl.
*C02F 1/28* (2006.01)
*C02F 1/461* (2006.01)

(52) U.S. Cl.
CPC .......... *C02F 1/46114* (2013.01); *C02F 1/283* (2013.01); *C02F 2201/002* (2013.01);
(Continued)

(58) Field of Classification Search
CPC ......... C02F 1/28–1/288; C02F 1/46114; C02F 1/463; C02F 1/465;
(Continued)

(56) References Cited

U.S. PATENT DOCUMENTS 3,616,356 A   10/1971  Roy
3,793,173 A   2/1974   Kawahata et al.
(Continued)

FOREIGN PATENT DOCUMENTS

WO   2004/079840 A2   9/2004

OTHER PUBLICATIONS

Rao, N.N.; Rohit, M.; Nitin, G.; Parameswaran, P.N.; Astik, J.K. "Kinetics of electrooxidation of landfill leachate in a three-dimensional carbon bed electrochemical reactor." Chemosphere. vol. 76, Iss 9. Jun. 28, 2009. pp. 1206-1212.*
(Continued)

*Primary Examiner* — Steven A. Friday
(74) *Attorney, Agent, or Firm* — Banner & Witcoff, Ltd.

(57) ABSTRACT

The present invention relates to provide a carbon bed electrolyzer (CBE) unit for electrochemical treatment. More particularly the present invention relates to the treatment of recalcitrant wastewater, e.g. from chemical industry. Further the said CBE unit is useful for electrolytic treatment of liquid effluent having very high concentrations of Chemical oxygen Demand (COD), Total Kjeldahl Nitrogen (TKN) and Biochemical Oxygen Demand (BOD), and Total Dissolved Solids (TDS), and for improving biodegradability of the effluent. More particularly, the present invention relates to an electro oxidation process wherein the carbon bed gets regenerated in-situ continuously.

20 Claims, 6 Drawing Sheets

Figure 1A:
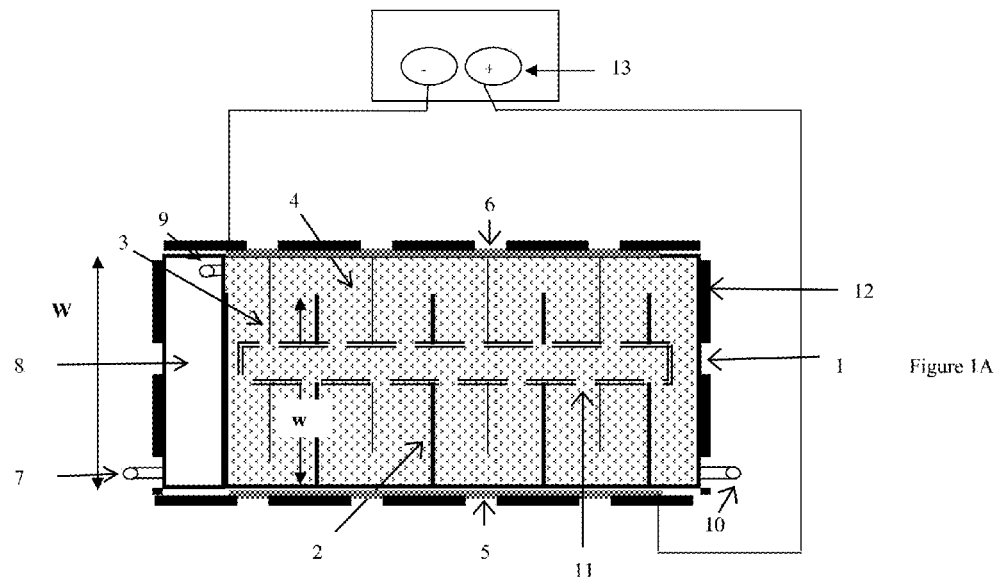

(52) U.S. Cl.
CPC .......... *C02F 2201/4611* (2013.01); *C02F 2201/4616* (2013.01); *C02F 2201/4618* (2013.01); *C02F 2209/44* (2013.01); *C02F 2301/043* (2013.01)

(58) Field of Classification Search
CPC ....... C02F 1/4672–1/4678; C02F 2001/46119; C02F 2001/46123; C02F 2001/46133
See application file for complete search history.

(56) References Cited

U.S. PATENT DOCUMENTS

| | | |
|---|---|---|
| 3,900,377 A | 8/1975 | Enns et al. |
| 3,915,822 A | 10/1975 | Veltman |
| 3,919,062 A | 11/1975 | Lundquist, Jr. et al. |
| 3,988,221 A * | 10/1976 | Garrett ............ C02F 1/46114 204/222 |
| 4,161,435 A * | 7/1979 | Moeglich ............ C02F 1/46114 204/553 |
| 4,585,539 A | 4/1986 | Edson |
| 5,062,940 A | 11/1991 | Davies |
| 5,549,812 A | 8/1996 | Witt |
| 5,565,107 A * | 10/1996 | Campen .................... C02F 1/78 205/688 |
| 5,690,806 A | 11/1997 | Sunderland et al. |
| 5,702,587 A | 12/1997 | Clifford et al. |
| 5,744,028 A | 4/1998 | Goto et al. |
| 5,770,037 A | 6/1998 | Goto et al. |
| 6,274,028 B1 | 8/2001 | Hu et al. |
| 6,298,996 B1 | 10/2001 | Spiegel et al. |
| 6,572,759 B1 * | 6/2003 | Nishimura ............ B01D 53/32 204/242 |
| 2002/0185383 A1* | 12/2002 | Sakakibara ............ C02F 1/463 205/758 |
| 2004/0188246 A1 | 9/2004 | Tran et al. |
| 2006/0211906 A1* | 9/2006 | Berezutskiy .............. C02F 1/28 585/820 |
| 2008/0078673 A1* | 4/2008 | Elson .................. C02F 1/46114 204/278.5 |

OTHER PUBLICATIONS

International Search Report dated Sep. 27, 2011 (PCT/IB2011/000594); ISA/EP.
Written Opinion dated Sep. 27, 2011 (PCT/IB2011/000594); ISA/EP.

* cited by examiner

CARBON BED ELECTROLYSER FOR TREATMENT OF LIQUID EFFLUENTS AND A PROCESS THEREOF

CROSS-REFERENCE TO RELATED APPLICATIONS

The present application is a U.S. National Phase filing of International Application No. PCT/IB2011/000594, filed on Mar. 21, 2011, designating the United States of America and claiming priority to Indian Patent Application No. 2888/DEL/2010, filed Dec. 6, 2010, and the present application claims priority to and the benefit of both of the above-identified applications, which are incorporated by reference herein in their entireties.

FIELD OF INVENTION

The present invention relates to provide a carbon bed electrolyser (CBE) unit for electrochemical treatment. More particularly the present invention relates to the treatment of recalcitrant wastewater, e.g. from chemical industry. Further the said CBE unit is useful for electrolytic treatment of liquid effluent having very high concentrations of Chemical Oxygen Demand (COD), Total Kjeldahl Nitrogen (TKN), Biochemical Oxygen Demand (BOD), Total Dissolved Solids (TDS), and for improving biodegradability of the effluent. The present invention particularly relates to process intensification for efficient and effective electrolytic process with bearing on the rate of electrolysis and hence the rate of effluent treatment. More particularly, the present invention relates to an electro oxidation process wherein the carbon bed gets regenerated in-situ continuously.

BACKGROUND OF INVENTION

Industrial wastewater contains a host of pollutants, organic and inorganic types. The complexity of wastewater composition often demands application of advanced processes for achieving the desirable effluent quality and for improving the treatment efficiency of one or more intermediate process stages. Among the many approaches, electrochemical methods have been regarded as suitable for the treatment objectives of different types of wastewaters. It has been shown that many organic impurities in aqueous phase can be removed effectively by direct or indirect electrochemical oxidation. The electro oxidation applications primarily involve very specific anodic reactions to generate specific oxidants such as hydroxyl radicals at the polarized electrodes (anode) which is referred as 'direct' oxidation. Hydroxyl free radical is a very powerful, non-specific oxidizing species which attacks most organic molecules as well as oxidizable inorganic molecules and ions. Hydroxyl radicals may be produced by irradiation with ultraviolet light of particles of titanium dioxide dispersed in water or by reaction of hydrogen peroxide with iron salts dissolved in mildly acidic solution, called Fenton's reaction. Redox species such as $Cl_2/OCl^-$ can also cause a type of oxidation called 'indirect' oxidation.

It is found that electro-oxidation of pollutants in bi-polar cell comprising of different anode materials was by far the most studied systems. In this type of cells, anode and cathode plates are arranged parallel to each other at specific distance, called inter electrode spacing, allowing them to come in contact with liquid effluent and applying potential for a specific period to afford contaminant removal. In this type of parallel plate design, the stability of anode materials, poor mass transfer as well as reaction rates, and longer reaction times are of paramount importance. The lack of stable and inexpensive anodes and the need for mixing devices and accompanying higher costs are more of concern in the parallel plate configuration. Among the many approaches to overcome the mass transfer limitations in such reactors is the use of electrodes that comprise particulate materials are known. Since these electrodes possess higher surface area, the reactors including them are expected to have high surface area to volume ratio, and hence can give rise to higher rates of reaction. These electrodes are referred as '3-D electrodes' in literature. More recently, cells employing three-dimensional electrodes, such as bulk/block electrodes, were used for enhancing the treatment efficiency. The three dimensional electrode reactors can yield higher treatment efficiency due to higher surface area-to-volume ratio. However, the prior art using 3-D electrodes was developed to address mainly the cathodic processes for recovery of metals by deposition of a metal from an aqueous solution. Because these 3-D electrodes comprised mainly particulate materials e.g., graphite, carbon, and metals in different shapes and forms considering the process constraints dictated by cathode environment. The same 3-D electrodes can not be used for driving anodic processes with high energy efficiency and contaminant removal efficiency, particularly under high applied current. Fundamental studies on the kinetics and mechanism of the purification of wastewaters in different types of electrochemical reactors can be found in the literature. The research mainly relates to development of electrodes, devices and methods for electrochemically producing oxidants, disinfectants, metal hydroxides, etc. for removing or decomposing the specific chemical compounds and microbial pollutants.

Prior-art search was made in patent as well as non-patent literature. Following references are referred due to their relevance to the field of present invention.

U.S. Pat. No. 3,793,173 (1974) describes "wastewater treatment using electrolysis with activated carbon cathode", for production of hydrogen peroxide through oxygen reduction at hollow porous carbon cathode. The hydrogen peroxide reacts with organic pollutants in wastewater which thereby gets treated. The system requires injection of oxygen in the cathode region or requires maintaining high concentration of dissolved oxygen in wastewater for obtaining higher rates of removal of organic contaminants. In this art, only the cathode region is of three-dimensional nature.

U.S. Pat. No. 3,919,062 (1975) describes "electrochemical system graduated porous bed sections", that is claimed to be useful for pollution control, electrochemical synthesis and metal recovery. According to this invention, the reaction zone contains electrically conductive particles, such as carbon pellets disposed between primary electrodes and electrolyte flows in a direction parallel to voltage gradient between the primary electrodes. The reactor has graduated sections of porous bed having different thickness; the sections were separated by insulating spacers. However, the reactor is claimed to be capable of handling large quantities of dilute electrolyte solutions, especially effective for removal of metal ions from dilute aqueous solutions.

U.S. Pat. No. 3,915,822 (1975) describes "electrochemical system with bed sections is having variable gradient" according to which electrochemical reaction zones were built using three primary electrodes and electrically conductive discrete particles contained in the reaction zones. The system establishes different voltage gradients across adjacent sections of the reaction zones. Electrolyte can be circulated through the sections serially and homogeneous treatment of wastes for metal recovery can be obtained. This type of bed reactor has a major disadvantage that it requires more than one DC source to create sections having variable voltage gradient. Further, the use of the reactor for treating wastewater containing high concentrations of organic impurities has not been tested.

U.S. Pat. No. 4,585,539 (1986) discloses "Electrolytic reactor", according to which a sealed volume reactor wherein two separate chambers are associated with the cathode and anode, the two chambers separated by microporous electrically insulating septum, one of the chambers filled with electrically conductive particulate material-stainless steel balls-acting as extensions of the electrode in that chamber. The device can be used for recovery of metallic impurities from dilute solutions. However, due to use of insulating septum (ceramic) to separate the chambers the system would require application of higher voltages and use of stainless steel balls in anode region may be leading to their dissolution. Further, the invention did not look at the potential of the device to degrade organic contaminants.

U.S. Pat. No. 5,549,812 (1996) described "process and apparatus for processing industrial wastewater by electrolysis" according to which a cascade type arrangement of electrodes was provided for treatment of only contaminants susceptible for precipitation and sedimentable flocculates. The principle of operation mainly depends on the 'electrofloatation'. This art employs Al or Fe electrode plates defined by ribs or strips on one plate against which a flat surface of the other plate can be fixed. These electrodes undergo dissolution releasing metal ions as flocculating agents which adsorb organic compounds and subsequently/settle as the case may be. The main purpose of such an electrode arrangement with narrow inter electrode spacing is not only to allow liquid to flow in a meandering path, but also to increase flow velocity by constricting the flow with the help of ribs and insulating guide strips. Moreover the art demands application of pulse DC current and also pulse flow of water.

U.S. Pat. No. 5,690,806 (1997) discussed "cell and method for the recovery of metals from dilute solutions" according to which the cell comprises a porous carbon fiber material placed in porous tubular support as cathode. This along with a tubular anode encased in non-porous outer casing functions to recover valuable metals from wastes. Again, this invention relates to the recovery of metals from dilute solutions and does not address removal of organic pollutants. The possibility of using carbon fiber material stuffed in porous tubular support as 3-D anode was not envisaged in this art.

U.S. Pat. No. 5,702,587 (1997) discloses a method for "chemical and electrochemical regeneration of active carbon" wherein an apparatus for regenerating active carbon subsequent to saturation by use and a method for enhancing the adsorption capacity of active carbon is described. In accordance with this invention the reaction of ferrous ions with electro generated hydrogen peroxide in an electrolytic cell having carbon cathode containing adsorbed, oxidizable, organic materials and a conventional metallic anode that allows oxidation of oxidizables. The method employs transition metal salts or chelate of a transition metal ion to aid hydroxyl radical formation from electro generated hydrogen peroxide and requires external supply of oxygen and expensive anodes. The system suffers from certain issues like rate limiting by oxygen diffusion, tested with distilled water having low concentration of phenol, requires intermittent pH adjustment, requires longer operating times as high as 60 h, and involves multiple cycles of separate operations, viz. adsorption, desorption and destruction.

U.S. Pat. No. 5,744,028 (1998) describes "water treating apparatus" which incorporates an electrolytic cell including an anode, cathode and a three-dimensional carbon electrode provided between the anode and the cathode in a water dispensing apparatus. This system was tested useful for the removal of micro organisms and thereby water gets sterilized. However, the system suffers from the need for keeping the power supply on continuously for obtaining sterilization effect. The system can not be scaled up easily for effluent treatment systems having to treat large concentrations of organic compounds.

U.S. Pat. No. 5,770,037 (1998) describes "water processing method", using an electrolytic cell including an anode, a cathode, and a three-dimensional carbon electrode provided between the anode and cathode, for sterilizing water. It is stated that water to be treated should have at least 10 $M\Omega \cdot cm$ resistivity and inter-electrode separation is not more than, 1.0 mm. However, the 3-D fixed bed type of reactor has not been tested for removal of pollutants from effluents. Moreover, due to very less inter-electrode separation the size of 3-D carbon bed is also limited, thereby limiting throughput volume of treated water.

U.S. Pat. No. 6,298,996 (2001) discusses a "three dimensional electrode for electrolytic removal of contaminants from aqueous waste streams". According to this invention, high surface area charged metal particles are constantly in motion in the spouted cathode area, into this area a jet of stream containing the trace heavy metal contaminants is introduced whereby deposition of heavy metals on the charged metal particles takes place. While the spouted electrode design provided for lowering mass transfer limitations and increasing geometric current densities, the use of metal particles as charged anodes in anode area, similar to those in cathode area is seriously limited due to the possibility of corrosion and anodic dissolution and therefore anodic reactions can not be effectively carried out using such spouted electrode systems and hence oxidative removal of organic contaminants can not be done using the apparatus described in this patent.

U.S. Pat. No. 6,274,028 (2001) discloses "electrolytic wastewater treatment method and apparatus" describes a method and apparatus for purifying aqueous effluent streams to reduce contamination as measured by chemical oxygen demand, where the method comprises direct oxidation of water-soluble organic and oxidizable inorganic substances in an electrolytic oxidation cell that incorporates stainless steel electrodes, and wherein the stability and lifetime of the anode are enhanced by incorporation of metal chips. While, the system is claimed to be useful for wastewaters having chemical oxygen demand in the range 200-2000 ppm, the use of stainless steel anodes and iron chips leads to sludge and flocs generation which needs to be separated. Since a portion of organic compounds get removed adsorbed on the surface of sludge and flocs, this will have to be treated as any other hazardous sludge requiring special disposal methods.

A patent WO 2004/079840 A2 (2004) discusses "three-dimensional flow-through electrode and electrochemical cell" useful for water treatment, and environmental cleanup. The three-dimensional flow-through electrode includes an efficient current feeding mechanism including current feeders comprising rods of conductive material, such as graphite, which are inserted into a block of graphite felt. The invention specifically addresses the method of feeding electrical current into a three-dimensional electrode composed of graphite felt and does not aim for achieving higher surface area to volume ratios required for efficient treatment of effluents.

In order to overcome problems associated with prior art, there is need for intensification of electrolytic treatment process of liquid effluents which will avoid or minimize the above described problems. The intensification will desirably have one or many features as follows: i) relatively inexpensive anode materials, viz. high surface area granular activated carbon, instead of noble metal oxide stabilized titanium anodes or otherwise ii) relatively simple design, viz. a tank type reactor instead of sealed, concentric cylindrical and spouted electrode designs iii) a single channel flow of liquid effluent having sufficiently longer flow path, iv) both anode and cathode are 3-D type, instead of only one v) without any insulating plastic or ceramic barriers between anode and cathode, and only spatial separation and contact and electrolytic resistance in the reaction zones should be adequate vi) high rate of contaminant removal from high organic strength effluents, vii) lower power consumption, viii) smaller reactor footprint compared to the conventional unit processes in the effluent treatment, e.g., chemical precipitation, clariflocculation, biooxidation etc. No prior art presented above is able to oxidize high concentrations of organic substrates, or oxidize in a non-specific manner a vide variety of chemical substances present in actual wastewaters leading to overall improvement in the effluent quality. Moreover, the potential of an electrochemical method, particularly electro oxidation for treating actual wastewater such as chemical industry wastewater comprising large concentrations of several non-specific pollutants and having very high concentrations of Chemical Oxygen Demand (COD), Biochemical Oxygen Demand (BOD), Total Kjeldahl Nitrogen (TKN) and Total Dissolved Solids (TDS), has not been explored.

OBJECTIVES OF THE INVENTION

The primary objective of the present invention is to provide a carbon bed electrolyser useful for electrochemical treatment of wastewater such as from chemical industry, pulp and paper, textile, leather, pharmaceutical, electroplating unit operations, etc.

Yet another objective of the present invention is to incorporate an improvement in the form of 3-D carbon bed in the tank type reactor. The carbon bed constituting of conducting grade, high surface area granular activated carbon which being in the electric field generated by powering the primary carbon plate anode and primary stainless steel cathode acts as 3-D electrode, i.e., the carbon bed around carbon anode defines the anode reaction zone, and that around stainless steel cathode defines cathode reaction zone in the carbon bed electrolyser.

Another objective of the present invention is to incorporate an improvement in terms of creating several such reaction zones in the cascade form in the same tank reactor by using plurality of electrodes in the carbon bed electrolyser.

Yet another objective of the present invention is to incorporate an improvement in terms of single channel flow of liquid effluent which ensures greater opportunity for the organic pollutant molecules for reaction with the in-situ generated reagents in the reactor from the time of its entry into the carbon bed electrolyser till it leaves the same.

Yet another objective of the present invention is to use the carbon bed electrolyser for electrolytic treatment of liquid effluent having very high concentrations of total organic carbon, total kjeldhal nitrogen, total dissolved solids, sulphates, biochemical oxygen demand, and heavy metals.

Yet another objective of the present invention is to insert the proposed carbon bed electrolyser as a new unit process in a conventional treatment scheme or intercept the conventional treatment scheme in the form of pre-treatment unit and to then improve the efficiency of the downstream biological treatment and achieve desired overall treatment efficiency.

Yet another objective of the present invention is to use the carbon bed electrolyser either single or plural or either in series or in parallel to achieve desired degree of effluent treatment.

SUMMARY OF THE INVENTION

Accordingly, the present invention provides a carbon bed electrolyser (CBE) unit for liquid effluent treatment comprising a reactor (1) having a set of carbon anode plates (2) being fixed to one side of the said reactor and a set of stainless steel cathode plates (3) being fixed to the opposite side of the said reactor; wherein the said anode and cathode electrodes being made of shorter width than the width of the said reactor and being spaced parallel to each other in a cathode-anode-cathode-anode type alternate arrangement to force the liquid to flow in a single channel path, a rectifier (13) for providing direct current to the said electrodes (2) and (3) being connected externally and separately with corresponding bus bars (5) and (6), a granular activated carbon (GAC) (4) with high surface area being provided in the space between each pair of said electrodes to form a packed carbon bed in each compartment for adsorption as well as particle electrodes, the said reactor having an inlet (7) to carry the effluent, a buffer chamber (8) to hold liquid effluent that adopts single channel flow path through another inlet valve (9) inside the said buffer chamber and an outlet valve (10) to carry the treated effluent from the said reactor, also the said reactor being provided with a long cover and leak proof opening (11) at the bottom along the length to conveniently remove the spent carbon, a Galvanized Iron (GI) welded structure (12) being provided for securing the said reactor.

In another aspect of the present invention a process for the treatment of liquid effluent by using the CBE unit, comprising the following steps of: (a) removing the suspended solids from the raw effluent through known coagulation/flocculation process or micro filtration, or filter press method or combination thereof; (b) adding 2.0-4.0 kg NaCl per cubic meter of feed effluent to induce indirect electro oxidation process, (c) feeding the raw effluent free of suspended solids and having high concentration of organic and inorganic pollutants into the carbon bed electrolyser until the electrodes and carbon bed are submerged, (d) closing the inlet and outlet of the unit to commence batch mode of operation, (e) allowing the effluent of step (c) to stay in contact with the carbon bed for 1-2 hours, (f) repeating steps (c) to (e) to attain saturation sorption, wherein saturation sorption is attained by 4-6 repetitions of steps (c) to (e) and total time period required is in the range of 8-10 hours, (g) switching on the rectifier, and setting 6.0-7.0 V and 200-250 A to ensure electrolysis initially in batch mode while inlet and outlet valves are closed, (h) visibly observing gas evolution from the electrode surfaces as a consequence of electrolysis and adjusting the current to increase rate of electrolysis (i) collecting the samples from the last section of the electrolyser away from the inlet valve and evaluating the test samples for reduction in pollution parameters, particularly Chemical Oxygen Demand (COD), Total Kjeldahl Nitrogen (TKN) and Biochemical Oxygen Demand (BOD), (j) operating the electrolyser in batch mode until greater than 60-70% COD removal is attained, (k) switching the reactor from the batch mode to continuous mode, by opening the inlet and outlet valves and feeding the electrolyser at a fixed flow rate that allows a minimum residence time for the effluent to react in the electrolyser, (l) operating the electrolyser under continuous feeding of pre treated effluent at the specified feed rate and monitoring for the desired parameters periodically for assessing the reactor performance, (m) draining the treated effluent for further treatment in a biological treatment unit in order to obtain desired treated effluent.

BRIEF DESCRIPTION OF THE TABLES

Table 1: Major physicochemical characteristic of raw effluent from chemical industry Table 2: Reduction in COD due to electrochemical oxidation of chemical industry effluent in CBE (Batch mode)

Table 3: Testing of CBE performance in batch mode—chamber wise

Table 4: Electrochemical oxidation of chemical industry effluent in the CBE (vertical flow mode batch operation)

Table 5: Reduction in COD and TKN during electrochemical oxidation of chemical industry effluent in the CBE (Batch mode)

Table 6: Electro oxidation of chemical industry effluent in CBE (Continuous)

Table 7: Electrochemical oxidation of coagulated effluent sample in CBE (Continuous)

Table 8: Major physicochemical characteristic of treated effluent after coagulation and electro oxidation

BRIEF DESCRIPTION OF THE ACCOMPANYING DRAWINGS

FIG. 1A: represents schematics of the CBE according to the present invention

Figure 1B:
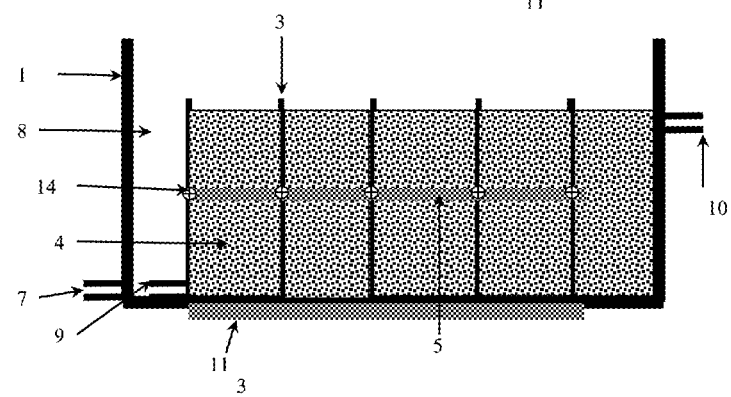

FIG. 1B: represents side-cut view of the CBE according to the present invention

Figure 1C:
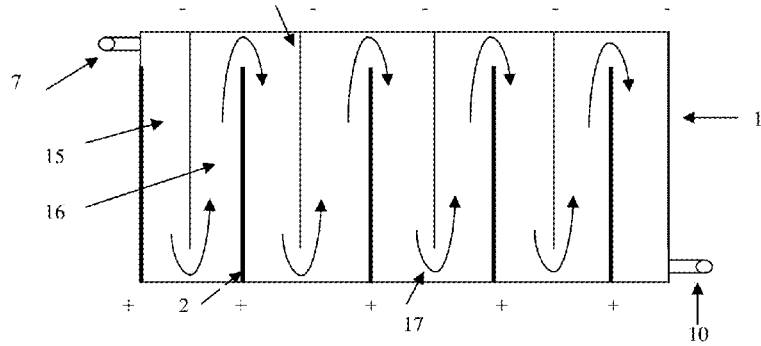
Figure 2:
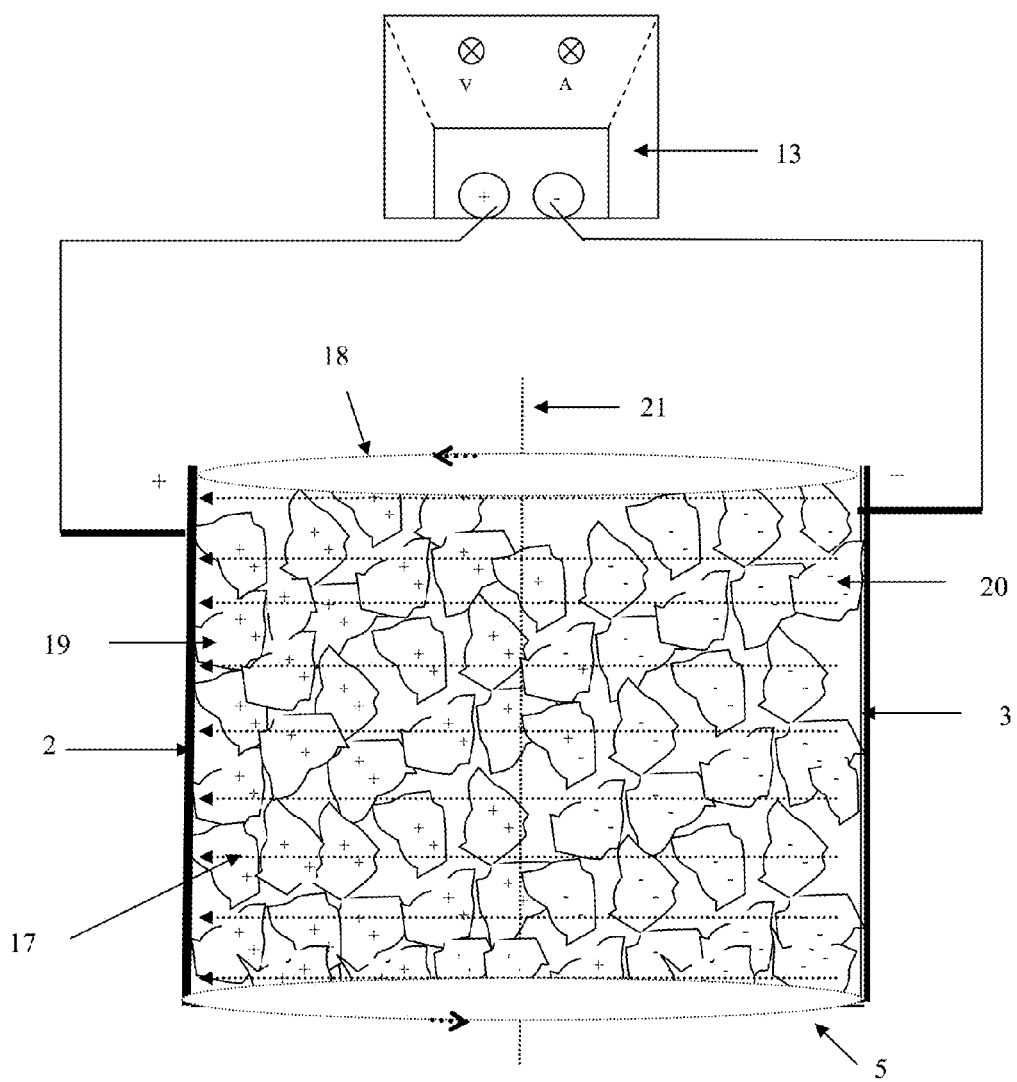
Figure 3:
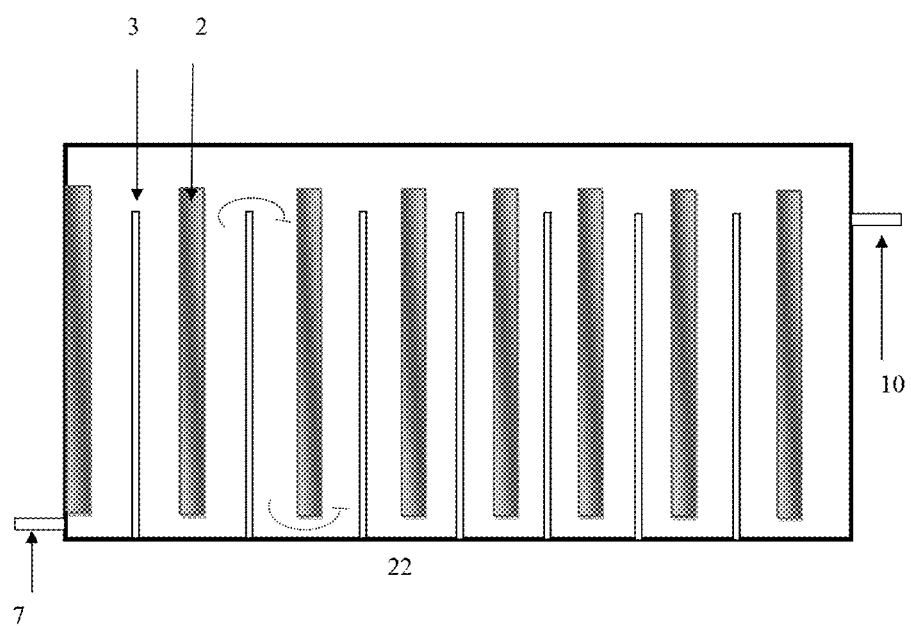
Figure 4:
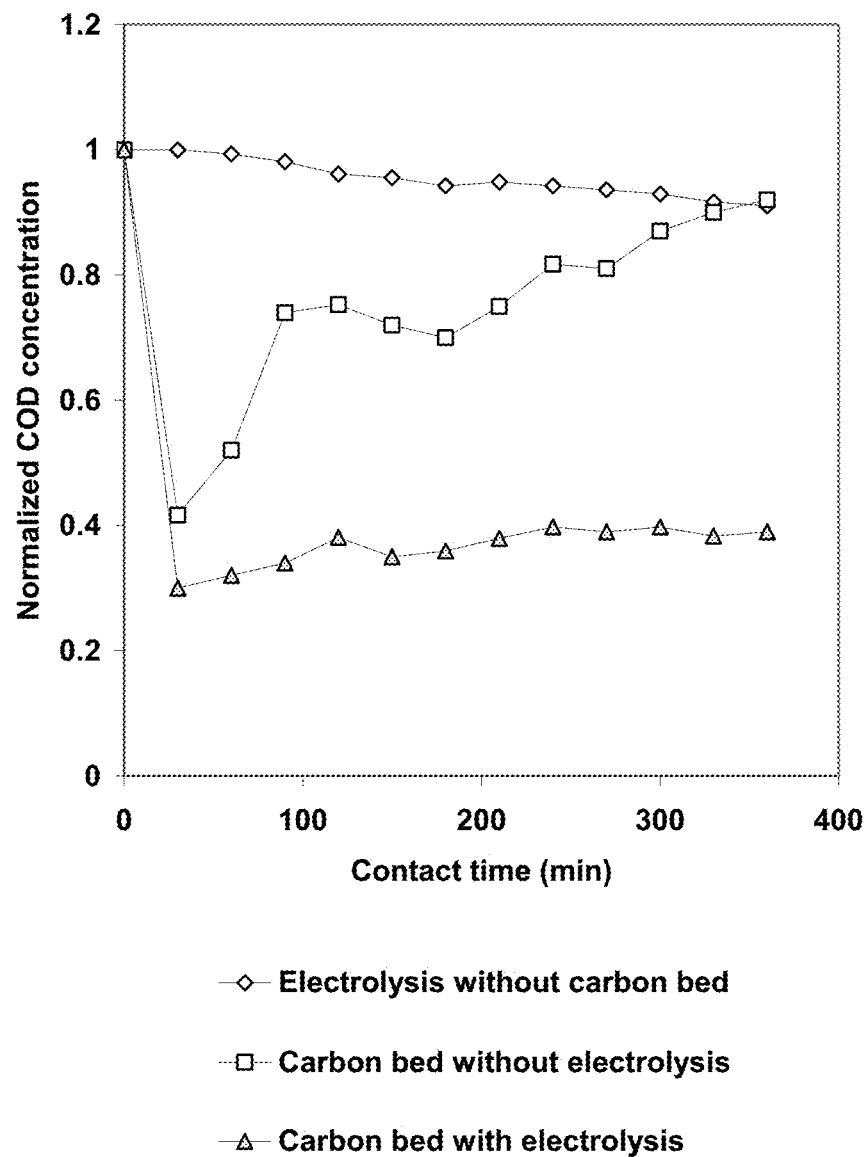

FIG. 1C: represents a perspective view of single channel flow of the CBE according to the present invention FIG. 2: represents a perspective view of the CBE in the form of 3-D carbon bed FIG. 3: represents a perspective view of vertical cross section of the reactor FIG. 4: represents a graphic illustration of the functioning of the CBE unit for the removal of chemical oxygen demand (COD)

FIG. 5: represents a schematic illustration of efficiency of the CBE towards removal of chemical oxygen demand (COD)

Figure 6:
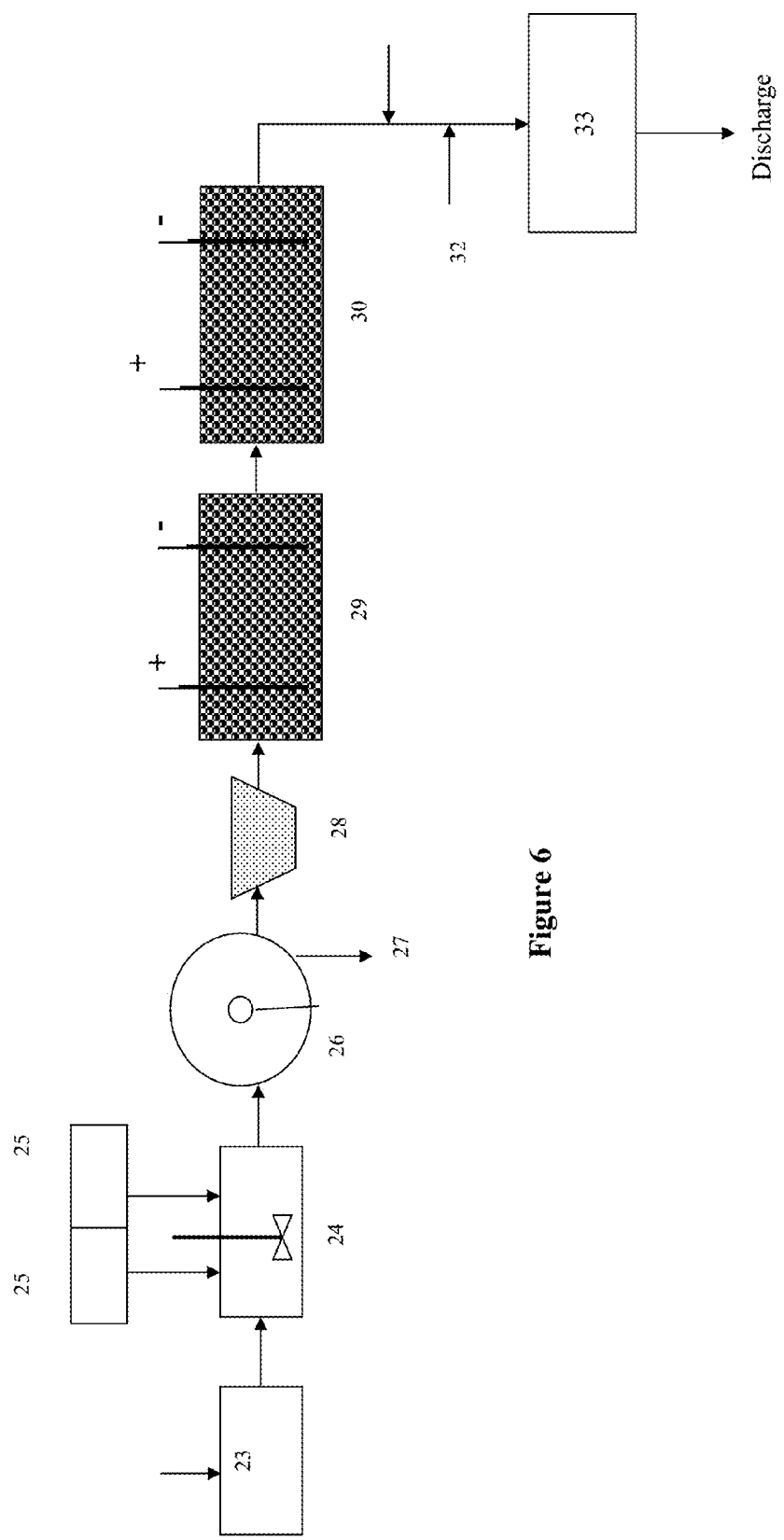

FIG. 6: represents schematic illustration of inclusion of a pair of CBE units (7) and (8) in series

DETAIL DESCRIPTION OF THE ACCOMPANYING DRAWINGS

FIG. 1A: represents schematics of the CBE incorporating details of improvements as per this invention. The reactor (1) with provisions for electrodes (2, 3), carbon bed (4), electrode bus bars (5, 6), inlet (7), buffer chamber (8), inlet (9) in buffer chamber, outlet drain (10), closed opening (11) at the bottom of the reactor (1), GI frame (12) and rectifier (13) constitutes the CBE.

FIG. 1B: represents side-cut view of the CBE incorporating details of improvements as in FIG. 1A. The reactor (1) with provisions for electrodes (2), the leak-proof fasteners (14), electrode bus bar (5), carbon bed (4), inlet (7), buffer chamber (8), inlet (9) in buffer chamber, and outlet drain (10) and closed opening (11) at the bottom of the reactor (1) for taking out spent carbon in case of any need, as described in FIG. 1a of the CBE.

FIG. 1C: represents a perspective view of the improvement in terms of single channel flow of liquid effluent which ensures greater opportunity for the organic pollutant molecule for reaction with the in-situ generated reagents in the reactor from the time of its entry into CBE till it leaves the same. The schematic view that illustrates the alternate arrangement of electrodes; anodes (2) and cathodes (3) vertically in the reactor and due to the fact that the anode (2) and cathode (3) plates are shorter than the width of the reactor (w<W) as shown in FIG. 1A, the feed effluent enters the reactor (1) through the inlet (7) and flow from one reaction zone (15) to next reaction zone (16) and so on till it comes out from the outlet (10) which can be described as single channel flow of feed effluent in the path way indicated by the curved arrows (17) as per the CBE of FIG. 1.

FIG. 2: represents a perspective view of the improvement in the electrolyser in the form of 3-D carbon bed in open-tank reactor and considering a section of the reactor representing single pair of electrodes drawn to illustrate that how the carbon particles polarise under the uniform electric field (17) developed between the polarized anode (2) and cathode (3) considering a pair of electrodes and packed bed of carbon in between them, electrically connected to power supply (13) as employed in the CBE of FIG. 1. The electric field lines converge at the outer edges of the electrodes represented by circular arrows (18). It may be seen that the carbon particles in the vicinity of anode (2) behave as 'particle anodes' (19) and those around cathode (3) act as 'particle cathodes' (20). The line (21) depicts hypothetical barrier equidistant from primary electrodes and comprises neutral particles along the line, because these particles experience both positive and negative electric field.

FIG. 3: represents a perspective view of vertical cross section of the reactor in which electrodes arrangement is so made to allow vertical flow of liquid effluent. The SS cathodes (3) are fixed to the bottom of the reactor, where as the anodes (2) are displaced vertically from the bottom by a distance of 2-4", leaving a gap between anode bottom and the reactor bottom (22). Alternatively, anodes may be fixed to the bottom of the reactor and SS cathodes may be lifted vertically by 2-4" offset distance from the bottom of the reactor. Due to this arrangement of electrodes, the liquid effluent that enters the reactor through inlet (7) flows upwards vertically and then changes its course over the cathode to flow downwards, as indicated by arrows in this figure, and this sequence repeats through all the sections of the reactor till the liquid comes out of the outlet (10).

FIG. 4: represents a graphic illustration of the functioning of the CBE unit for the removal of chemical oxygen demand (COD) under three different experimental conditions, viz. electrolysis without carbon bed (4) in FIG. 1A, carbon bed without electrolysis (by disconnecting rectifier (13) in FIG. 1A) and with both carbon bed (4) and rectifier (13). This figure illustrates synergic effect of applying electricity to carbon bed as per this invention as illustrated in FIG. 1A.

Figure 5A:
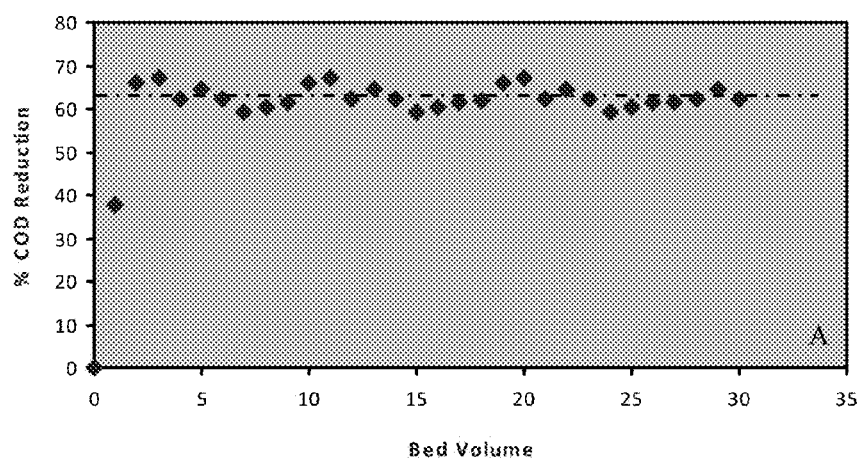

FIG. 5: represents a schematic illustration of efficiency of the CBE as illustrated in FIG. 1 towards removal of chemical oxygen demand (COD) as shown in FIG. 5(A), and also enhancement in the ratio of biochemical oxygen demand (BOD) and COD as shown in FIG. 5 (B) which indicates improved biodegradability of the treated effluent using the CBE as per this invention.

FIG. 6: represents schematic illustration of inclusion of a pair of CBE units (29) and (30) in series into comprehensive effluent treatment scheme. According to this illustration, high COD effluent is collected into equalization tank (23), which then passes through flash mixer unit (24) into which a coagulant and coagulant aid is added in specified doses from dosing tanks (25). The treated effluent from (24) is flown into clariflocculator (26) followed by sand filter (28). The sludge from bottom of (26) is sent to sludge drying beds (27). The effluent free of suspended solids then enters the CBE stage I (29) followed by stage II (30). The effluent from CBE stage II (30) then mixes with the other available low COD streams (31 and 32), which then enters the biological treatment unit (33) namely, activated sludge process (extended aeration) before final discharge.

DETAILED DESCRIPTION OF THE INVENTION

While the invention is susceptible to various modifications and alternative forms, specific aspect thereof has been shown by way of example and graphs and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

The Applicants would like to mention that the examples are mentioned to show only those specific details that are pertinent to understanding the aspects of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a process, catalyst composition that comprises a list of components does not include only those components but may include other components not expressly listed or inherent to such process. In other words, one or more elements in a system or process proceeded by "comprises . . . a" does not, without more constraints, preclude the existence of other elements or additional elements in the system or process.

In the following detailed description of the aspects of the invention, reference is made to the accompanying drawings and graphs that form part hereof and in which are shown by way of illustration specific aspects in which the invention may be practiced. The aspects are described in sufficient details to enable those skilled in the art to practice the invention, and it is to be understood that other aspects may be utilized and that charges may be made without departing from the scope of the present invention. The following description is, therefore, not to be taken in a limiting sense, and the scope of the present invention is defined only by the appended claims.

Accordingly a carbon bed electrolyser (CBE) unit for liquid effluent treatment comprising a reactor (1) having a set of carbon anode plates (2) being fixed to one side of the said reactor and a set of stainless steel cathode plates (3) being fixed to the opposite side of the said reactor; wherein the said anode and cathode electrodes being made of shorter width than the width of the said reactor and being spaced parallel to each other in a cathode-anode-cathode-anode type alternate arrangement to force the liquid to flow in a single channel path, a rectifier (13) for providing direct current to the said electrodes (2) and (3) being connected externally and separately with corresponding bus bars (5) and (6), a granular activated carbon (GAC) (4) with high surface area being provided in the space between each pair of said electrodes to form a packed carbon bed in each compartment for adsorption as well as particle electrodes, the said reactor having an inlet (7) to carry the effluent, a buffer chamber (8) to hold liquid effluent that adopts single channel flow path through another inlet valve (9) inside the said buffer chamber and an outlet valve (10) to carry the treated effluent from the said reactor, also the said reactor being provided with a long cover and leak proof opening (11) at the bottom along the length to conveniently remove the spent carbon, a Galvanized Iron (GI) welded structure (12) being provided for securing the said reactor.

In yet another aspect of the invention wherein the granular activated carbon (GAC) bed gets regenerated in-situ continuously and allows for prolonged use of carbon without being regenerate externally.

In yet another aspect of the invention wherein the CBE unit effectively reduces Chemical Oxygen Demand (COD), Biochemical Oxygen Demand (BOD), Total Kjeldahl Nitrogen (TKN), ammonia, including inorganic constituents.

In yet another aspect of the invention wherein the applied current vary as the electric power consumption is adjusted depending upon the electrode surface area, cathode-anode separation distance, electrical conductivity of granular activated carbon (GAC) particles, electrical conductivity of the effluent and initial and targeted concentrations of pollution parameters.

In yet another aspect of the invention wherein the reactor (1) is made of reinforced cement concrete (RCC), fiber reinforced plastic (FRP), or polypropylene or combination thereof. A person in skilled in the art may select any other material to make the reactor.

In yet another aspect of the invention wherein the bus bars (5) and (6) are made up of high electricity conducting materials such as aluminum or copper or combination thereof. A person in skilled in the art may select any other conducting material.

In yet another aspect of the invention wherein all the anode plates are fixed to one side of the reactor at specified distances, preferably with centre-to-centre distance in the range of 0.25-0.35 m and all the cathode plates are fixed to the opposite side of the reactor at a preferred inter-cathode centre-to-centre distance of 0.25-0.35 m which allows single channel flow path for liquid effluent to ensure greater opportunity for the organic pollutant molecule to react with oxidants generated at feeder and carbon bed electrodes in the reactor from the time of its entry into the reactor till it leaves the reactor.

In yet another aspect of the invention wherein all the cathodes are fixed to the bottom of the reactor while anodes can be lifted by an offset distance in the range of 2 to 4 inch or vice versa in an alternative electrode arrangement to allow for vertical mode of single channel flow of liquid effluent from one section to the next section till the treated effluent flows through outlet.

In yet another aspect of the invention wherein the height of electrodes is so adjusted that it is in the range of 25-35% less than the height of the plastic reactor thereby allowing for free board that allows for holding any scum or foam which may form during operation and thus avoids overflow and spillage of effluent.

In yet another aspect of the invention wherein free board, $1/4^{th}$ to $1/3^{rd}$ the height of the reactor, is provided to hold extra liquid in the reactor in case of any obstruction to free flow of liquid through the reactor due to back pressure which may occur if feed effluent is not adequately free from suspended solids and when the voids in the carbon bed are blocked by suspended solids.

In yet another aspect of the invention wherein the particle size of granular activated carbon (GAC) is at least 60-80% of geometric volume of the reactor; the preferred particle size range is in the range of 2-10 mm, and surface area as large as possible and preferably at least 500 $m^2/g$.

In yet another aspect of the invention wherein the granular activated carbon (GAC) bed offers an effective liquid effluent volume which is equivalent to the drainable pore volume, which is about 25-30% of the reactor volume.

In yet another aspect of the invention a provision is provided, in the form of a long covered and leak proof opening at the bottom of the reactor along its length for emptying the carbon from the reactor.

In yet another aspect of the invention wherein the unit is assembled in plurality in series to get a desired higher degree of treatment or in parallel to get greater volumetric rate of treatment when included in any functional treatment scheme of effluents to afford higher treatment efficiency through a functional biological treatment plant.

In yet another aspect of the invention wherein the process for the treatment of liquid effluent by using the CBE unit comprising the following steps of: (a) removing the suspended solids from the raw effluent through known coagulation/flocculation process or micro filtration, or filter press method or combination thereof, (b) adding 2.0-4.0 kg NaCl per cubic meter of feed effluent to induce indirect electro oxidation process (c) feeding the raw effluent free of suspended solids and having high concentration of organic and inorganic pollutants into the carbon bed electrolyser until the electrodes and carbon bed are submerged, (d) closing the inlet and outlet of the unit to commence batch mode of operation, (e) allowing the effluent of step (c) to stay in contact with the carbon bed for 1-2 hours, (f) repeating steps (c) to (e) to attain saturation sorption, wherein saturation sorption is attained by 4-6 repetitions of steps (c) to (e) and total time period required is in the range of 8-10 hours, (g) switching on the rectifier, and setting 6.0-7.0 V and 200-250 A to ensure electrolysis initially in batch mode while inlet and outlet valves are closed, (h) visibly observing gas evolution from the electrode surfaces as a consequence of electrolysis and adjusting the current to increase rate of electrolysis, (i) collecting the samples from the last section of the electrolyser away from the inlet valve and evaluating the test samples for reduction in pollution parameters, particularly Chemical oxygen Demand (COD), Total Kjeldahl Nitrogen (TKN) and Biochemical Oxygen Demand (BOD), (j) operating the electrolyser in batch mode until greater than 60-70% COD removal is attained (k) switching the reactor from the batch mode to continuous mode, by opening the inlet and outlet valves and feeding the electrolyser at a fixed flow rate that allows a minimum residence time for the effluent to react in the electrolyser, (l) operating the electrolyser under continuous feeding of pre treated effluent at the specified feed rate and monitoring for the desired parameters periodically for assessing the reactor performance, (m) draining the treated effluent for further treatment in a biological treatment unit in order to obtain desired treated effluent.

In yet another aspect of the invention wherein the feed effluent is pre-treated to remove suspended solids substantially to a final value <50 mg/l, which also preferably removes >10% COD simultaneously through any of the known processes from coagulation-flocculation, micro filtration, tube settler, or filter press operations or combination thereof.

In yet another aspect of the invention wherein an effective hydraulic retention time is provided in the range 1-4 hours, for the effective treatment of effluents by adjusting the effluent feed rate into the electrolyser.

In still another aspect of the invention, a carbon bed electrolyser (CBE) unit and a process thereof useful for the electro oxidative treatment of liquid effluents which degrade pollutants and increase effluent's biodegradability substantially as herein described with reference to the examples.

Industrial effluents contain a variety of organic and inorganic compounds. A number of organic compounds among them exert microbial toxicity and hence may not be readily biodegradable. The chemical structures of these compounds may be complex containing the aromatic moieties containing benzene, naphthalene or anthracene rings, including different functionalities, azo (—N=N—), Carbonyl (=C=O), Carbon-Carbon (=C=C=); Carbon-Nitrogen (>C=NH, —CH=N—); Nitroso (—NO, N—OH); Nitro (—$NO_2$ or =NO—OH) and Sulfur (>C=S and other carbon-sulfur groups). The present invention originates from the fact that the chemical structures can be readily modified, or destroyed using primary oxidants generated through application of electric potential between two suitable electrodes immersed in the select wastewater sample. The system leads to transformation and degradation of different organic molecules through repeated reaction steps involving the oxidants generated in-situ in the system. The present invention relates to polarization of conducting grade activated carbon granules packed between primary electrodes in open-tank type reactor, carbon granules which when in the electric field generated by powering the primary carbon plate anode and primary stainless steel cathode get polarized and act as 'particle electrodes' and hence the entire carbon bed as a '3-D electrode', i.e., the carbon bed around carbon anode defines the anode reaction zone, and that around SS cathode defines cathode reaction zone. The present invention relates to combining electrolytic means of generating oxidizing agents and adsorption of organic pollutants on carbon bed for achieving greater and speedier mineralization of the organic pollutants including removal of several other pollutants, viz. total organic carbon, total kjeldhal nitrogen, total dissolved solids, sulphates, biochemical oxygen demand, and heavy metals leading to overall improvement in effluent quality.

The present invention also relates to incorporation of novel ideas to allow the treatment of high concentrations of organic contaminants in effluents, e.g., chemical industry, paper, textile, leather, pharmaceutical, electroplating, etc., using an CBE as described herein.

The present invention is concerned with the carbon bed electrolyser and electrolytic (pre)-treatment process for complex effluents. The CBE provides for carbon adsorption-regeneration process in one chamber and allows for prolonged use of carbon without having to regenerate it externally.

The schematic of the CBE is given in FIG. 1 and description of various parts of the reactor is provided in the following paragraph.

FIG. 1 presents a schematic top view of the carbon bed electrolyser as per this invention. The material of construction (MOC) of the tank type reactor (1) can be reinforced cement concrete (RCC), fiber reinforced plastic (FRP), polypropylene (PP) etc. RCC may be preferred as MOC for large size reactors to be used for large volume on-site treatment applications. On the other hand, FRP and PP are preferable for modular type transportable reactor tanks. PP is more preferable in view of its suitability for sealing or welding techniques. Metal sheets should not be used for fabrication of the reactor as metal is prone for corrosion and also poses risk of electric shock which may occur in the present context of electrolyser unit. As per this invention, the use of carbon plate anodes is essential. The anode (2) material should be electrically conducting carbon or graphite. Replacing the carbon plate anodes with metallic anodes leads to anodic dissolution of metallic anodes. This leads to considerable sludge formation which impairs the functions of the electrolyser as per this invention. The cathode material can be chosen from low cost metals such as cast iron, stainless steel (SS 304, 316 etc). The number of electrodes in a reactor depends upon the size of the reactor to be fabricated. Both the anode and cathode plates are of shorter width than the width of the reactor (w<W), and all the cathodes are fixed to one side of the tank reactor at specified distances using leak proof PVDF fasteners. This would allow for horizontal flow of liquid in the reactor. Aluminum or copper strips can be used as bus bar (6) materials for electrical connection, however, copper is preferred over Al because Cu is more conducting and less vulnerable for damage under chemical environment. Metallic fasteners should not be used as they will short the electrodes to bus bar electrically and bus bars may suffer damage as well as risk of electrical shock exists. Similarly, all the anodes are fixed to the opposite side of the reactor using anode bus bar (5) conforming to the alternate arrangement of electrodes in the reactor e.g., cathode-anode-cathode-anode and so on. All the electrodes are placed vertically in the reactor and parallel to each other and slid into the PP channels fixed on the inside of the side walls of the reactor body. This arrangement constitutes an inventive step that allows for simply sliding the electrodes into the channels with ease and for easily replacing one or many electrodes as and when required without having to cause damage or breakage to them. Alternatively, all the cathodes can be fixed to the bottom of the reactor while anodes can be lifted by a suitable offset distance or vice versa to allow for vertical flow of liquid from one section to next section. In an inventive step, the said arrangement of electrodes allows for single channel flow of liquid effluent which ensures greater opportunity for the organic pollutant molecule for reaction in the reactor from the time of its entry into the reactor till it leaves the reactor. Electrical connection to anodes with the rectifier positive pole is secured through anode bus bar; similarly all the cathodes are electrically connected to the negative pole of the rectifier through cathode bus bar. Both the bus bars are 0.003 m thick copper strips of sufficient length to connect all the electrodes of each type on either side of the reactor. Alternatively, Al strips can also be used. In another inventive step, the space between each pair of electrodes is filled with granular activated carbon (4). The carbon bed in each compartment offers as many reaction zones as the pairs of electrodes. Granular activated carbon having 0.002-0.01 m particle size and approximately 500 m$^2$/g or greater surface area can be charged into the space between the pairs of anodes and cathodes. The height of the carbon bed is approximately maintained as that of electrodes, so that all electrodes are adequately positioned in the carbon bed and the presence of electrodes can be barely seen from the top of the reactor.

As per this invention, the use of carbon bed is essential. Without carbon bed the system will lead to very low reaction rates, longer hydraulic retention times, and large number of reactor units compared to the device as per this invention. Use of metal balls, scrap, filings, powders, bits, should not be made in place of carbon particles as they undergo severe anodic dissolution. On the side of the inlet (7) to effluent, a buffer chamber (8) approximately $\frac{1}{10}^{th}$ of the volume of the reactor is provided as pre-settling chamber as well as to allow for examining the feed for adequate quality in terms of the concentration of suspended solids and in case feed is of poor quality the inlet (7) may be closed. Inside the buffer chamber there is another inlet valve (9) through which the feed enters the main reaction zone defined by the carbon bed sections. After flowing through the sections of the carbon bed, as per the designed single channel flow path, the treated liquid effluent leaves the reactor through the outlet (10). A provision (11) for emptying the carbon from reactor is provided at the bottom of the reactor, in case of eventual replacement of spent carbon. It consists of a long, covered and leak proof opening at the bottom of the reactor along the length so that carbon from all sections can be emptied easily. The entire tank type reactor is secured in a GI welded structure (12) that supports the reactor body from outside and prevents any accidental opening up of the plastic reactor body as it holds large quantity of GAC and liquid effluent. The reactor is powered up by connecting the respective bus bars to the appropriate poles of the rectifier (13), anode bus bar (5) to positive pole and cathode bus bar (6) to negative pole. The power rating of electrical connections/wires joining the bus bars with the rectifier should be such that they withstand high current passage through them.

The process for the treatment of a liquid effluent using the CBE unit comprises the following steps: a) removing the suspended solids from the raw effluent through well known coagulation/flocculation process or micro filtration, or filterpress method, b) adding common salt to feed effluent in a prescribed quantity to induce indirect electro oxidation process, c) feeding the raw effluent free of suspended solids and having high concentration of organic and inorganic pollutants into the CBE until the electrodes and carbon bed are submerged, d) closing the inlet and outlet of the CBE initially to commence batch mode of operation, e) allowing the effluent to stay in contact with the carbon bed for some time, which usually takes about 1 hour, f) repeating steps (d) and (e) until saturation sorption is attained, which will be about 4-6 times, and total time period need may be about 8-10 hours, g) switching on the rectifier, and setting appropriate voltage and current to ensue electrolysis initially in batch mode while inlet and outlet valves are closed, h) visibly observing gas evolution from the electrode surfaces as a consequence of electrolysis and adjusting the current to increase rate of electrolysis as may be required, i) collection of samples from the last section of the CBE away from the inlet valve and evaluating the test samples for reduction in pollution parameters, particularly COD, BOD, TKN, etc, j) operating the CBE in batch mode until satisfactory and >60-70% COD removal is attained, k) switching the reactor from the batch mode to continuous mode, by opening the inlet and outlet valves and feeding the CBE at a fixed flow rate that allows a minimum residence time for the effluent to react in the CBE, l) operating the CBE under continuous feeding of pretreated effluent at the specified feed rate and monitoring for the desired parameters periodically for assessing the reactor performance, and m) draining the treated effluent for further treatment in a biological treatment unit The Inventive Steps Involved in the Present Invention 1. The CBE is built on the integration of two functions: i) electrochemical oxidation of water and other anions (e.g. Cl⁻) at anode to generate various oxidants (hydroxyl, oxychloride radicals etc.); and ii) adsorption of various organic compounds on activated carbon. Feeding electric current to electrodes in the electrolyser helps to polarize carbon particles which then behave as 'particle' electrodes. Because of this, the adsorbed organic compounds get oxidized under the influence of electric field. Thus, the carbon surface regeneration occurs in-situ, and on continued application of potential to electrodes, both adsorption and electro regeneration processes take place simultaneously leading to improved effluent treatment efficiency.

2. The size selection as well as specific arrangement of electrodes in the reactor e.g., cathode-anode-cathode-anode and so on which allows for single channel flow path for liquid effluent which also ensures greater opportunity for the organic pollutant molecule for reaction in the reactor from the time of its entry into the reactor till it leaves the reactor which obviates the direct short flow path and without which the device gives rise to very poor treatment efficiency.

3. Use of a bed of high surface area activated carbon granules in the space between carbon plate anode and stainless cathode which when in the electric field generated by powering the primary carbon plate anode and primary stainless steel cathode acts as 3-D electrode with higher surface area-to volume ratio and outperforms the general parallel plate configuration based reactors developed for the similar purpose. Without carbon bed the system will lead to very low reaction rates, longer hydraulic retention times, and large number of reactor units compared to the device as per this invention.

4. Creation of several such reaction zones in cascade form in the same tank reactor by using plurality of electrodes that allows for treatment of larger volumes effluent which is otherwise a serious limitation with the general parallel plate configuration based reactors developed for the similar purpose.

5. Providing CBE treatment for high strength recalcitrant effluent to induce biodegradability to effluents.

EXAMPLES

The following examples are given by way of illustration of the present invention and therefore should not be construed to limit the scope of the present invention. Furthermore, it should be understood that the CBE and the CBE treatment process described herein might be extended to other types of suitable wastewaters also, in principle, particularly if the effluent contains organic pollutants and chloride together in significant quantities.

All the examples described below relate to a CBE unit fabricated as per this invention and having reactor size length, 1.83 m; breadth, 0.915 m; and height, 0.915 m and tank volume approximately equal to 1.53 m³. Five numbers each of carbon anodes (0.0254 m thick and 0.52 m² geometric area) and stainless steel (SS) cathodes (0.002 m thick and 0.52 m² geometric area) were used. The height of electrodes is so chosen that it is approximately 25% less than the height of the reactor to allow for sufficient free board to avoid spillage during operation and for holding scum/foam, if formed. The center-to-center distance between two anode plates or cathode plates can be in the range 0.25 m; however shorter distance is preferred because it reduces internal resistance and thereby voltage requirement. A free board of ¼$^{th}$ height of the reactor is provided to hold extra liquid in the reactor in case of any obstruction to free flow of liquid through the reactor. A rectifier having design rating of 0-25 V and maximum 500 A current outputs is used to supply the requisite electrical power to the reactor. Granular activated carbon having 0.01 m particle size and 500 m²/g is charged into the space between the pairs of anodes and cathodes. The amount of GAC required was approximately 650 kg and carbon bed volume was approximately 1.02 m³. The carbon bed volume can be in the range 80% of geometric volume of the reactor. This provides for a drainable pore volume equal to 30% of the reactor volume. This reactor has a measured 'drainable pore volume' (working volume) of approximately 0.4 m³. This is equal to the volume of the effluent which can be treated in batch mode. As an example, arrangement of electrodes in CBE is altered to check its applicability for treatment when the liquid effluent flows in vertical direction following single channel flow path. In this alternative arrangement, as described in the FIG. 3, all the cathodes are fixed to the bottom of the reactor while anodes are lifted by a suitable offset distance or vice versa to allow for vertical flow of liquid from one section to next section following single channel flow path.

Example 1

In this example the role of combination of carbon bed and electrolysis is illustrated by way of comparison to COD removal under certain control conditions, viz. electrolysis without carbon bed (4) in FIG. 1, carbon bed without electrolysis (power supply from rectifier (13) discontinued). The segregated effluent from chemical industries is filled into the carbon bed electrolyser, electrical connections from the electrolyser were connected to the rectifier and the rectifier was switched on and 244 A was applied. The observed voltage was 6.8 V. The onset of electrolytic reactions at the anodes and cathodes could be visibly seen through the gas generation. The reactor was operated for 6 h with intermittent samplings from the outlet after every 30 min. The observed reduction in COD is presented in FIG. 4. It is found that electrolysis without carbon bed results in <10% COD reduction. Further, the COD initially declines rapidly by adsorption over carbon bed and gradually carbon the bed gets saturated with adsorbed organics under the absence of applied electric field. In contrast, 70% COD removal efficiency is maintained relative to the initial COD by application of combination of carbon bed and electrolysis as per the inventive step of the carbon bed electrolyser. The data indicates about 70% COD removal during 4 h contact period in the CBE relative to the initial COD.

Example 2

Physicochemical Characteristics of Segregated Raw Effluent from Chemical Industries Electrochemical Oxidation of Diluted Effluent Segregated raw effluent from the group of chemical industries manufacturing a variety of chemicals was considered for treatment in the CBE in batch mode. The physicochemical characteristics of the segregated raw effluent are presented in Table 1. The effluent has high concentrations of COD, TKN, and TDS along with many other pollutants. The biodegradability index as defined by the BOD:COD ratio is low indicating poor biodegradability of the effluent.

TABLE 1

Major physicochemical characteristic of raw effluent from chemical industry

| Sr. No. | Parameter | Effluent |
|---|---|---|
| 1 | pH | 7.9 |
| 2 | Alkalinity | 1,557 |
| 3 | COD | 31,200 |
| 4 | BOD | 7,488 |
| 5 | TKN | 23,800 |
| 6 | Total Ammonia ($NH_3$—N) | 8,260 |
| 7 | Chlorides | 18,410 |
| 8 | Suspended Solids | 2,780 |
| 9 | Total dissolved solids | 1,18,880 |
| 10 | Sulphates | 600 |
|  | BOD:COD | 0.24 |

Note:
All values are given in mg/l except pH and BOD:COD.

Initially, 2-times diluted effluent was considered for treatment with an initial COD concentration of 15660 mg/l was prepared separately and subjected to treatment in the CBE in batch mode. The carbon bed was first allowed to attain saturation adsorption of organic compounds to account for adsorptive removal of COD. 2.0 kg NaCl per $m^3$ of effluent is added as a source for initiating indirect electro oxidation. The effluent was fed into the CBE unit through the buffer chamber and after sometime, nearly colorless effluent came out through the outlet of the reactor. After several fill-react-draw cycles, the carbon bed attained adsorptive saturation. At this stage of steady state adsorption, the effluent quality at the outlet and inlet is nearly comparable. Initially the reactor was operated in the batch mode, by switching off the inlet pump and closing the inlet and outlet valves.

The electrical connections from CBE were connected to the rectifier and the rectifier was switched on and 244 A was applied. The observed voltage was 6.8 V. The onset of electrolytic reactions at the anodes and cathodes could be visibly seen through the gas generation. The CBE was operated for 4 h with intermittent samplings from the outlet after every 30 min. The observed reduction in COD is presented in Table 2. The data indicates about 70% COD removal during 4 h contact period in the CBE relative to the initial COD.

TABLE 2

Reduction in COD due to electrochemical oxidation of chemical industry effluent in CBE (Batch mode)
Operating conditions: Current: 244 A, Voltage: 6.8 V, Time: 4 h, $pH_{initial}$: 8.4, $pH_{final}$: 8.9

| Time (min) | COD | % COD Reduction |
|---|---|---|
| 0 | 15660 | — |
| 30 | 7569 | 51.7 |
| 60 | 4248 | 72.9 |
| 90 | 4248 | 72.9 |
| 120 | 4794 | 69.4 |
| 150 | 4416 | 71.8 |
| 180 | 4624 | 70.5 |
| 210 | 4624 | 70.5 |
| 240 | 4690 | 70.1 |

Example 3

Chamber Wise Testing for the Performance of CBE

In a similar batch experiment as described in Example 2, the COD removal was monitored in different anode-cathode chambers at different time intervals to assess whether the removal of COD was uniform in all the chambers Table 3. The COD removal from all the anode-cathode chambers was found to be comparable, with the exception of the first chamber which indicated higher COD values which is immediately next to the inlet. The comparable percent COD removals in all the chambers confirms that the carbon bed in CBE behaves uniformly as 'particle' electrode system.

TABLE 3

Testing of CBE performance in batch mode - chamber wise
Operating conditions: Current: 244 A, Voltage: 6.8 V, Time: 4 h, $pH_{initial}$: 8.4

|  | $(COD)_{1\,h}$ | $(COD)_{2\,h}$ | $(COD)_{3\,h}$ |
|---|---|---|---|
| Initial | 15660 | 15660 | 15660 |
| Chamber 1 | 6500 | 7506 | 7250 |
| 2 | 6250 | 7006 | 6500 |
| 3 | 6250 | 6750 | 6500 |
| 4 | 6750 | 6750 | 6500 |
| 5 | 6750 | 6500 | 6500 |
| 6 | 6750 | 6500 | 6500 |
| 7 | 6750 | 6250 | 6250 |
| 8 | 6750 | 6500 | 6250 |
| 9 | 6750 | 5750 | 6250 |
| Average COD | 6610 | 6612 | 6500 |
| % COD removal | 57.7 | 57.7 | 58.5 |

Example 4

COD Removal in CBE Having Vertical Flow of Liquid from Section to Section

This example illustrates the applicability of CBE having alternate arrangement of electrodes to facilitate vertical flow liquid effluent from section to section as per the description in FIG. 3. Segregated wastewater from a group of chemical industries with an initial COD concentration 21300 mg/l was treated in the CBE having vertical flow of liquid from section to section in batch mode. The electrical connections from CBE were connected to the rectifier and the rectifier was switched on and approximately 600 A was applied. The observed voltage was 6.0 V. The reactor was operated for 8 h with intermittent samplings from the outlet after every 2 h. The observed reduction in COD is presented in Table 4. The data indicates about 52% COD can be removed during 8 h contact period.

TABLE 4

Electrochemical oxidation of chemical industry effluent in the CBE (vertical flow mode, batch operation)
Operating conditions: Current: 600 A, Voltage: 6.0 V, NaCl: 2.0 kg/$m^3$, Wastewater volume: 0.4 $m^3$

| Time (hrs) | COD (mg/l) | % Reduction |
|---|---|---|
| Initial | 21300 | — |
| 2 | 17200 | 19.2 |
| 4 | 10180 | 52.2 |

Example 5

Simultaneous Removal of COD and Total Kjeldhal Nitrogen (TKN) from the Effluent During Treatment in CBE Segregated wastewater from a group of chemical industries with an initial COD concentration 16500 mg/l was treated in the CBE in batch mode. The electrical connections from CBE were connected to the rectifier and the rectifier was switched on and approximately 244 A was applied. The observed voltage was 6.4 V. The reactor was operated for 4 h with intermittent samplings from the outlet after every 30 min. The observed reduction in COD and TKN is presented in Table 5. The data indicates about 61% COD and 50% TKN can be removed during 4 h contact period in CBE relative to the initial COD and TKN concentrations.

TABLE 5

Reduction in COD and TKN during electrochemical oxidation of chemical industry effluent in the CBE (Batch mode)
Operating conditions: Current: 244 A, Voltage: 6.4 V, NaCl: 2.0 kg/m$^3$, Wastewater volume: 0.4 m$^3$

| Sr. No. | Time (min) | COD (mg/l) | % COD Reduction | TKN (mg/l) | % TKN Reduction |
|---|---|---|---|---|---|
| 1 | 0 | 16500 | — | 8745 | — |
| 2 | 30 | 9222 | 44.1 | 3780 | 56.8 |
| 3 | 60 | 6552 | 60.3 | 4340 | 50.4 |
| 4 | 90 | 6310 | 61.8 | 4340 | 50.4 |
| 5 | 120 | 6310 | 61.8 | 4340 | 50.4 |
| 6 | 150 | 6310 | 61.8 | 3780 | 56.8 |
| 7 | 180 | 6310 | 61.8 | 4480 | 48.8 |
| 8 | 210 | 6554 | 60.3 | 4340 | 50.4 |
| 9 | 240 | 6310 | 61.8 | 4060 | 53.6 |

Example 6

Demonstration of CBE Unit in Continuous Mode of Operation

The CBE provides satisfactory performance at hydraulic retention times (HRT) of 2 h. Lower retention times imply lesser pollutant removal efficiency and lower electric power consumption. Higher HRT means greater pollutant removal but at greater electric power consumption.

In this example, the CBE was operated in continuous mode at a flow rate of 0.20 m$^3$/h at 245 A and 6.8 V. This flow rate provided approximately 2 h HRT. The COD and TKN removal data is presented in Table 6. The COD removal efficiency was 57.9%, while 33.8% TKN was also reduced during 2 h. The COD reduction is comparable over many fresh bed volumes of composite effluent. When the flow rate was halved to 0.10 m$^3$/h. which gives 4 h hydraulic retention time, the COD removal efficiency was 70% and 42% TKN was also removed. When the flow rate was increased to 0.36 m$^3$/h which gives 1 h hydraulic retention time, the COD removal efficiency was 48% and 28% TKN was also reduced during 2 h. At much higher flow rate (0.54 m$^3$/h, 40 min. HRT) the COD reduction was less (23.8%) at 200 A (7.2 V).

TABLE 6

Electro oxidation of chemical industry effluent in CBE (Continuous)
Operating conditions: Current: 245 A, Voltage: 6.8 V, NaCl: 2 kg/m$^3$, HRT: 2 h Flow rate: 0.20 m$^3$/h

| Sr. No. | Time (min) | COD (mg/l) | % COD Reduction | TKN (mg/l) | % TKN Reduction |
|---|---|---|---|---|---|
| 1 | 0 | 18445 | — | 9513 | — |
| 2 | 60 | 7766 | 57.9 | 6020 | 36.7 |
| 3 | 120 | 7766 | 57.9 | 6300 | 33.8 |
| 4 | 180 | 8251 | 55.3 | 5040 | 47.0 |
| 5 | 240 | 8009 | 56.6 | 5989 | 37.0 |
| 6 | 300 | 8733 | 52.7 | 5460 | 42.6 |

The CBE performance with respect to changes in the applied current was also evaluated. The COD removal efficiency was 60.0% at 245 A (1 h HRT); 50.0% at 400 A (1 h HRT); and 39.0% at 100 A (1 h HRT). Therefore, application of 245 A gives optimum COD removal. However, maintaining HRT (e.g., 2 h, 0.20 m$^3$/h) results in better TKN removal. The initial concentration of COD in the feed can be expected to be affecting the CBE performance. In these experiments, the percent COD removals are: 30.0% (200 A, 2 h HRT, Initial COD=5500 mg/l); 60.0% (245 A, 2 h HRT, Initial COD=16500 mg/l); and 48% (245 A, 2 h HRT, Initial COD=25000 mg/l). The CBE unit can tolerate higher initial COD concentrations also, e.g., 25,000 mg/l.

Example 7

Electro Oxidation of Effluent in CBE after Coagulation Pretreatment

Generally the effluent should be free from suspended solids preferably or reduce it substantially prior to feeding to the CBE. Various options exist for reducing the concentration of suspended solids, viz. coagulation/flocculation, tube coagulation, micro filtration, and filter press processes. In this example, the raw effluent having initial COD of 31200 mg/l was initially treated with FeCl$_3$ coagulant and then the supernatant from this process was subjected to electro oxidation in the CBE. One cubic meter of raw effluent was taken and coagulation treatment was performed with lime (20 l of 0.5 g lime/l), 40% FeCl$_3$ (5 l) and 500 ml of polyelectrolyte (0.2%) under mechanical mixing. The coagulation treatment reduced initial COD by 16% while the suspended solids concentration was reduced to about 50 mg/l from 2200 mg/l. This pre-treated effluent was fed into the CBE for further treatment at Current: 200 A, Voltage: 6.2 V, NaCl: 2 kg/m$^3$, HRT: 1 h, Flow rate: 0.36 m$^3$/h. The electrochemical oxidation reduced the COD to 11355 mg/l amounting to 50.0% removal efficiency shown in Table 7 in 4 h. simultaneously 36.6% TKN was also reduced during 1 h. The detailed analysis of various parameters of effluents from coagulation, and coagulation+electro oxidation treatment are compared in Table 8. The results suggest an overall 78% COD removal and 30% TKN removal compared to their concentrations in the raw effluent. The COD and TKN removals accompany 41.8% BOD reduction also, while the BOD/COD ratio increased from 0.24 to 0.63. This data suggests that electro oxidation of the chemical industry effluents in CBE leads to significant enhancement in its biodegradability.

TABLE 7

Electrochemical oxidation of coagulated effluent sample in CBE (Continuous)
Operating conditions: Current: 200 A, Voltage: 6.2 V, NaCl: 2 kg/m$^3$, HRT: 1 h, Flow rate: 0.36 m$^3$/h

| Sr. No. | Time (min) | COD (mg/l) | % COD Reduction | TKN (mg/l) | % TKN Reduction |
|---|---|---|---|---|---|
| 1 | Raw effluent | 31200 | — | 9700 | — |
| 2 | After Coagulation | 26000 | 16.0 | 9300 | 4.1 |
| 3 | 60 | 14500 | 36.9 | 5893 | 36.6 |
| 4 | 120 | 12750 | 44.5 | 6160 | 33.8 |
| 5 | 180 | 12107 | 47.4 | 6500 | 30.1 |
| 6 | 240 | 11355 | 50.6 | 6200 | 33.3 |

(Lime (0.5 g/l), FeCl$_3$ (40%) 5 l, electrolyte 500 ml (0.2%) for the 1000 l of wastewater).

TABLE 8

Major physicochemical characteristic of treated effluent after coagulation and electro oxidation

| Sr. No. | Parameter | Raw Effluent | After Coagulation* | After Electro oxidation** |
|---|---|---|---|---|
| 1 | pH | 7.9 | 8.1 | 7.8 |
| 2 | Alkalinity | 1,557 | 3,600 | 16,380 |
| 3 | COD | 31,200 | 26,000 | 6,900 |
| 4 | BOD | 7,488 | 6100 | 4,357 |
| 5 | TKN | 23,800 | 23,550 | 16,380 |
| 6 | Total Ammonia ($NH_3$—N) | 8,260 | 525 | 1,020 |
| 7 | Chlorides | 18,410 | 16,600 | 10,810 |
| 8 | Suspended Solids | 2,780 | 24 | 10 |
| 9 | Total dissolved solids | 1,18,880 | 1,12,000 | 49,306 |
| 10 | Sulphates | 600 | 400 | 184 |
| 11 | BOD:COD | 0.24 | 0.23 | 0.63 |

Note:
All values are given in mg/l except pH.
*The 1000 l of raw effluent was taken and coagulation was performed with lime (20 l of 0.5 g lime/l), 5 l of 40% $FeCl_3$ and 500 ml of 0.2% polyelectrolyte).
**HRT-2 h; applied current 200 A, Voltage 6.2 V Example 8

Stabilization of Performance of the CBE

Figure 5B:
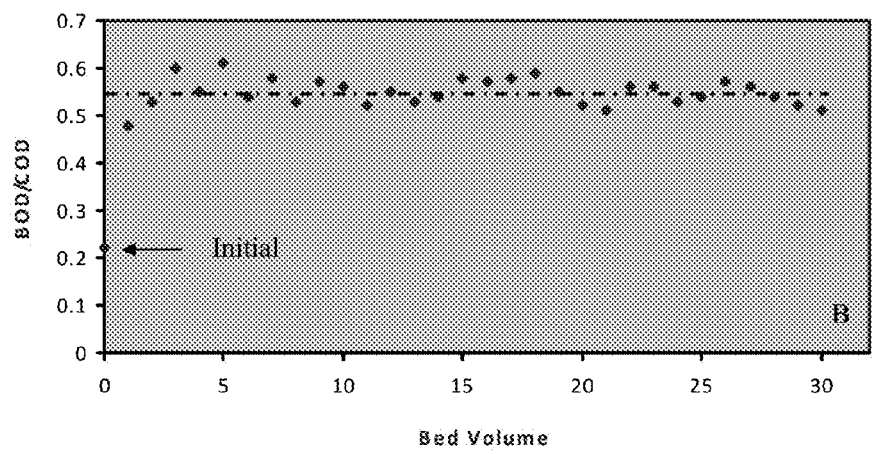

The performance of the CBE was monitored in terms of percent COD removal and BOD/COD ratio of the electro oxidized effluent as a function of treated bed volumes under the optimized conditions (200 A, 2 h HRT, FIG. 5). The performance stabilization of CBE with respect to COD reduction is depicted in FIG. 5A considering the number of bed volumes of the effluent treated in the reactor. The percent COD removal averages to 62% as examined over 30 bed volumes treated. The BOD/COD ratio of the treated effluent also increased and stabilized fairly at an average value of 0.56, as depicted in FIG. 5B.

Example 9

CBE as Pre-Treatment Unit Process in a Full-Scale Effluent Treatment Plant

This example illustrates usefulness of CBE operated in series in two-stages in a full-scale treatment option considering the volume of composite effluent to be 400 m³/d. As per the schematics shown in FIG. 6, Coagulation+Electro oxidation (stage I)+Electro oxidation (stage II)+Bio oxidation illustrates, the treatment option. The incorporation of two units of CBE after physicochemical treatment and prior to bio-oxidation unit ensures 70% COD reduction under the specified conditions (2 h, HRT, 200 A). The BOD/COD ratio of the electro oxidized effluent (0.56) is significantly high compared to 0.22 of feed effluent making the effluent amenable for bio oxidation.

Around 200 m³/d sewage and 1500 m³/d low COD stream (2000 mg/l) being treated at present in an existing functional CETP are available for dilution of electro oxidized effluent for further treatment combined in the bio-oxidation process. As the electro oxidized effluent is expected to receive dilution with identified low COD streams, it will be possible to achieve higher COD reduction in the bio-oxidation process. Considering the combined treatment of electro oxidized effluent, low COD stream and domestic sewage a COD removal of 80% is achievable of the recalcitrant effluent from chemical industries.

The advantages of the disclosed invention are thus attained in an economical, practical, and facile manner.

While preferred aspects and example configurations have been shown and described, it is to be understood that various further modifications and additional configurations will be apparent to those skilled in the art. It is intended that the specific embodiments and configurations herein disclosed are illustrative of the preferred nature and best mode of practicing the invention, and should not be interpreted as limitations on the scope of the invention.

ADVANTAGES

The main advantages of the carbon bed electrolyser for liquid effluent treatment as per the present invention are:
1) The preferred use of the CBE is for degrading organic pollutants and inducing biodegradation in recalcitrant effluents.
2) The CBE is applicable to effluents having high concentrations of organic compounds.
3) The CBE is suitable for controlling concentration of organic pollutants in industrial effluents.
4) The reaction of electro oxidation of organic pollutants in effluents readily sets in at the polarized electrode surfaces in the CBE.
5) In addition to parallel plate electrodes, the use of high surface area carbon bed as in CBE leads to process intensification as it allows for greater adsorption of organic pollutants.
6) In the present apparatus the oxidizing agents generated in-situ in CBE are powerful and break down complex organic compounds having saturated as well as unsaturated C—C, C—S, C—N, C—X (X=halogen) and C—O bonds into molecular fragments.
7) The CBE electro oxidation process mineralizes a part of organic pollutants into their inorganic by products, viz. $CO_2$, $SO_4^{2-}$, $NO_3^-$, etc. The other uses include: electrochemical synthesis, metal recovery, and pre- and post-treatments for effluents
8) The CBE electro oxidation process leads to removal of organic carbon and nitrogen simultaneously and potentially enhances biodegradation of the treated effluent.
9) The CBE is modular and can be used in plurality either in series or in parallel and can be included in any functional treatment scheme for achieving higher treatment efficiency.
10) The CBE electro oxidation process involves oxidation of adsorbed organic compounds on the electrode surface or oxidants produced on the electrode surface may diffuse into bulk of the effluent and attack the organic compounds
11) The unique feature of the CBE is in-situ regeneration of carbon bed. As the adsorbed organic compounds are continuously exposed to strong oxidation environment around electrode surface including particle electrode's surface, the carbon bed gets regenerated under the operating conditions. Therefore, the carbon bed in the reactor can offer longer usability and may require seldom replacement.
12) In the CBE electro oxidation process, the exhaustion rate of anodes/cathodes is very slow and therefore will not require their frequent replacement
13) The CBE process utilizes no hazardous reagents and sludge generation is almost negligible.
14) The electrical energy consumption by the CBE depends on the feed COD concentration and the targeted COD in the treated effluent. The process can be controlled by adjusting the feed current to a desired value.

15) The CBE process is environment friendly as it takes place at room temperature and atmospheric pressure and safe to operate.
16) The CBE process is cost effective for treatment of recalcitrant effluents compared to prevailing thermal treatments viz., incineration and evaporation.

We claim:

1. A carbon bed electrolyser (CBE) unit for liquid effluent treatment comprising:
   a reactor having a reactor body made of reinforced cement concrete, fiber reinforced plastic, or polypropylene or combination thereof having inlet and outlet valves, wherein a buffer chamber is located in the reactor and forms a section of the reactor, with a valve inside the buffer chamber connecting fluidly with a remaining section of the reactor;
   a set of anode plates and cathode plates being placed vertically in the remaining section of the reactor, wherein at least some of the anode and cathode plates have tops that are each spaced a distance from a top of the reactor that is approximately ¼ to ⅓ a height of the reactor,
   wherein the outlet valve is fixed to the reactor body at a valve height at least equal to heights of the anode plates and the cathode plates,
   wherein the anode plates are fixed within the reactor body at specified distances parallel to each other, with a pre-determined inter-anode centre-to-centre distance, and wherein the cathode plates are fixed within the reactor body at a pre-determined inter-cathode centre-to-centre distance, both the anode plates and the cathode plates being juxtaposed keeping a uniform anode-to-cathode distance not larger than 0.17 m,
   wherein the cathode plates are fixed to a bottom of the reactor body while the anode plates are lifted from the bottom of the reactor or vice versa in an alternative electrode arrangement,
   wherein a metal anode bus bar connects all the anode plates and is connected to a positive pole of an electrical rectifier, and wherein a metal cathode bus bar connects all of the cathode plates and is connected to a negative pole of the electrical rectifier,
   wherein a granular activated carbon is packed into the remaining section of the reactor,
   wherein a long covered leak proof opening is located at the bottom along a length of the reactor to remove the granular activated carbon when spent, and
   wherein a galvanized iron welded structure is located on all sides of the reactor.

2. The CBE unit as claimed in claim 1, wherein the anode and cathode bus bars are made of aluminum, copper, or a combination thereof.

3. The CBE unit as claimed in claim 1, wherein the reactor has a plurality of sections including the section and the remaining section, wherein all the cathode plates are fixed to the bottom of the reactor while the anode plates are lifted by an offset distance in a range of 2 to 4 inch or vice versa in the alternative electrode arrangement to allow for vertical mode of single channel flow of the liquid effluent from each of the plurality of sections to a next section of the plurality of sections until the effluent flows through the outlet valve.

4. The CBE unit as claimed in claim 1, wherein the height of each of the anode plates and the cathode plates is in a range of 25-35% less than the height of the reactor.

5. The CBE unit as claimed in claim 1, wherein the granular activated carbon occupies at least 60% of a geometric volume of the reactor; a particle size of the granular activated carbon is in a range of 2-10 mm, and a surface area of the granular activated carbon is at least 500 $m^2/g$.

6. The CBE unit as claimed in claim 5, wherein the granular activated carbon occupies 60-80% of the geometric volume of the reactor.

7. The CBE unit as claimed in claim 1, wherein the granular activated carbon offers an effective liquid effluent volume which is about 25-30% of a volume of the reactor.

8. The CBE unit as claimed in claim 1, wherein the uniform anode-to-cathode distance is 0.12-0.17 m.

9. A process for treatment of liquid effluent by using the CBE unit as claimed in claim 1, comprising:
   a. removing suspended solids from the effluent through a coagulation/flocculation process by addition of lime, ferric chloride, and polyelectrolyte, micro filtration, or filter press method or combination thereof;
   b. adding 2.0-4.0 kg NaCl per cubic meter of feed effluent to induce indirect electro oxidation process;
   c. feeding the effluent free of suspended solids and having organic and inorganic pollutants into the CBE unit until the anode and cathode plates and a granular activated carbon bed of the CBE unit are submerged;
   d. closing the inlet and outlet of the CBE unit to commence operating the CBE unit in a batch mode;
   e. allowing the effluent of step (c) to stay in contact with the carbon bed for 1-2 hours, releasing the effluent through the outlet valve, and adding additional effluent through the inlet valve;
   f. repeating steps (c) to (e) with the additional effluent until saturation sorption is attained;
   g. switching on the rectifier, and setting 6.0-7.0 V and 200-250 A to ensure electrolysis initially in the batch mode while the inlet and outlet valves are closed;
   h. adjusting a current to increase rate of electrolysis based on gas evolution from surfaces of the anode and cathode plates as a consequence of electrolysis;
   i. collecting samples of the effluent from a last section of the CBE unit between a last anode plate and a last cathode plate away from the inlet valve and evaluating the samples for reduction in pollution parameters including Chemical oxygen Demand (COD), Total Kjeldahl Nitrogen (TKN) and Biochemical Oxygen Demand (BOD),
   j. continuing operating the CBE unit in the batch mode until greater than 60% COD removal is attained;
   k. switching the reactor from the batch mode to continuous mode, by opening the inlet and outlet valves and feeding the CBE unit at a fixed flow rate that allows a minimum residence time for the effluent to react in the CBE unit;
   l. operating the CBE unit under continuous feeding of effluent at the fixed flow rate to treat the effluent and monitoring the pollution parameters periodically for assessing performance of the reactor;
   m. draining the treated effluent.

10. The process as claimed in claim 9, wherein in step (f) saturation sorption is attained by 4-6 repetitions of steps (c) to (e) and a total time period required to attain saturation sorption is in a range of 8-10 hours.

11. The process as claimed in claim 9, further comprising treating the feed effluent prior to addition of the feed effluent to remove suspended solids to a final value <50 mg/l and >10% COD through coagulation-flocculation by adding lime, ferric chloride and polyelectrolyte, micro filtration, tube coagulation, or filter press operations or combination thereof.

12. The process as claimed in claim 9, wherein an effective hydraulic retention time is provided in a range of 1-4 hours until greater than 60% COD removal is attained, for effective treatment of the effluent by adjusting a feed rate of the effluent into the CBE unit.

13. The process as claimed in claim 9, wherein in step (j) operation of the CBE unit in the batch mode is continued until 60-70% COD removal is attained.

14. A carbon bed electrolyser (CBE) unit for liquid effluent treatment comprising:
- a reactor having a reactor body made of reinforced cement concrete, fiber reinforced plastic, or polypropylene or combination thereof having inlet and outlet valves, wherein a buffer chamber is located in the reactor and forms a section of the reactor, with a valve inside the buffer chamber connecting fluidly with a remaining section of the reactor;
- a set of anode plates and cathode plates being placed vertically in the remaining section of the reactor, wherein at least some of the anode and cathode plates have tops that are each spaced a distance from a top of the reactor that is approximately ¼ a height of the reactor,
- wherein the outlet valve is fixed to the reactor body at a valve height at least equal to heights of the anode plates and the cathode plates,
- wherein the anode plates are fixed to one side of the reactor body at specified distances parallel to each other, with a pre-determined inter-anode centre-to-centre distance, and wherein the cathode plates are fixed to an opposite side of the reactor body at a pre-determined inter-cathode centre-to-centre distance, both the anode plates and the cathode plates being juxtaposed keeping a uniform anode-to-cathode distance not larger than 0.17 m,
- wherein a metal anode bus bar connects all the anode plates and is connected to a positive pole of an electrical rectifier, and wherein a metal cathode bus bar connects all of the cathode plates and is connected to a negative pole of the electrical rectifier,
- wherein a granular activated carbon is packed into the remaining section of the reactor,
- wherein a long covered leak proof opening is located at a bottom of the reactor along a length of the reactor to remove the granular activated carbon when spent, and
- wherein a galvanized iron welded structure is located on all sides of the reactor.

15. The CBE unit as claimed in claim 14, wherein the anode and cathode bus bars are made of aluminum, copper, or a combination thereof.

16. The CBE unit as claimed in claim 14, wherein heights of each of the anode plates and the cathode plates is in a range of 25-35% less than the height of the reactor.

17. The CBE unit as claimed in claim 14, wherein the granular activated carbon occupies at least 60% of a geometric volume of the reactor; a particle size of the granular activated carbon is in a range of 2-10 mm, and a surface area of the granular activated carbon is at least 500 m2/g.

18. The CBE unit as claimed in claim 17, wherein the granular activated carbon occupies 60-80% of the geometric volume of the reactor.

19. The CBE unit as claimed in claim 14, wherein the granular activated carbon offers an effective liquid effluent volume which is equivalent to a drainable pore volume, which is about 25-30% of a volume of the reactor.

20. The CBE unit as claimed in claim 14, wherein the uniform anode-to-cathode distance is 0.12-0.17 m.

* * * * *